United States Patent [19]

Ewan et al.

[11] Patent Number: 4,921,886

[45] Date of Patent: May 1, 1990

[54] PROCESS FOR THE DRY REMOVAL OF POLLUTING MATERIAL FROM GAS STREAMS

[75] Inventors: Thomas K. Ewan, Daingerfield; Thomas W. Musslewhite, Arp; Charles R. Barden, Austin; Thomas J. Weber, Perryton; Andrew D. Burnette; Adel Hedfi, both of Austin; Heather E. Cole, Red Oak, all of Tex.; James C. Moore, Texarkana, Ark.; Mark R. Jacubec, Brecksville, Ohio

[73] Assignee: Aerological Research Systems, Inc., Daingerfield, Tex.

[21] Appl. No.: 270,528

[22] Filed: Nov. 14, 1988

[51] Int. Cl.$^5$ .................... C01B 21/00; C01B 7/00; C01B 17/00

[52] U.S. Cl. .................... 423/235; 423/240; 423/242

[58] Field of Search .............. 423/242 A, 244 A, 235, 423/240 R, 242 R, 244 R, 240 S, 235 D

[56] References Cited

U.S. PATENT DOCUMENTS

| | | | |
|---|---|---|---|
| 3,385,030 | 5/1968 | Letvin | 55/90 |
| 3,490,204 | 1/1970 | Kalika | 55/94 |
| 3,567,194 | 3/1971 | Shah et al. | 261/118 |
| 3,582,050 | 6/1971 | Kozak | 261/36 |
| 3,812,656 | 5/1974 | Barnhart | 55/220 |
| 3,852,408 | 12/1974 | Ewan et al. | 423/242 |
| 3,852,409 | 12/1974 | Martin et al. | 423/242 |
| 3,894,851 | 7/1975 | Gorman | 55/94 |
| 4,141,701 | 2/1979 | Ewan et al. | 55/90 |
| 4,308,241 | 12/1981 | de Vries | 423/242 |
| 4,590,049 | 5/1986 | Staudinger | 423/242 |
| 4,708,855 | 11/1987 | Morrison | 423/242 |
| 4,726,940 | 2/1988 | Kobayashi | 423/240 |

OTHER PUBLICATIONS

Kelly, Mary E. and Shareef, S. A., *Third Survey of Dry SO$_2$ Control Systems*, Jun. 1981, Accession No. PB81-218976 U.S. Environmental Protection Agency Report No. EPA-600/7-81-097.

Apple, Cathy and Kelly, Mary E., *Mechanisms of Dry SO$_2$ Control Processes*, Apr. 1982, Accession No. PB82-196924 U.S. Environmental Protection Agency Report No. EPA-600/7-82-026.

*Primary Examiner*—Gregory A. Heller
*Attorney, Agent, or Firm*—Donald E. Degling

[57] ABSTRACT

A process for the removal of acidic gases from carrier gases employing a finely divided alkaline sorbent material is disclosed. The process includes, optionally, the step of conditioning the carrier gas to lower its temperature. The process comprises introducing a stream containing the alkaline sorbent material and mixing the alkaline sorbent material and the carrier gas, introducing a stream of vapor and liquid droplets and mixing the stream of vapor and liquid droplets with the stream of carrier gas containing the alkaline sorbent material. Thereafter a portion of the vapor is condensed and the alkaline sorbent material reacted with the acid gases to form products of reaction. Finally, the products of reaction and the remaining alkaline sorbent material are separated from the carrier gas stream. Preferably, the alkaline sorbent material is calcium based, e.g., calcium hydroxide or calcium carbonate and the vapor and liquid droplets comprise low pressure steam and water, respectively. The mixing process is facilitated by a free jet nozzle operated with a low pressure drop across the nozzle. The separation step may be formed in a fabric filter (baghouse) or an electrostatic precipitator.

31 Claims, 7 Drawing Sheets

FIG. 6
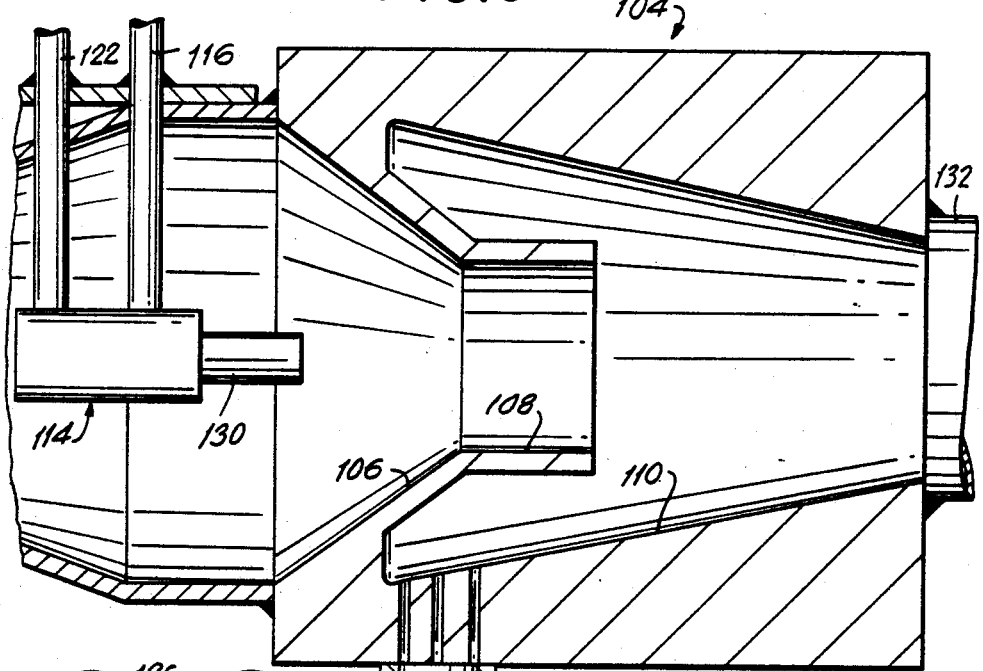
FIG. 6A
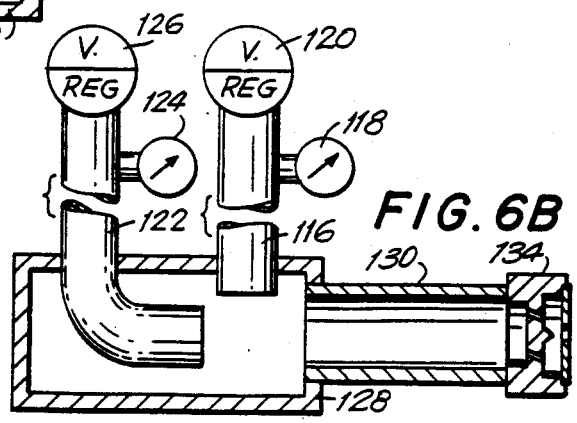
FIG. 6B

PROCESS FOR THE DRY REMOVAL OF POLLUTING MATERIAL FROM GAS STREAMS

BACKGROUND OF THE INVENTION

1. Field of the Invention

This invention relates to the field of air pollution control and more particularly to the removal of acid gases from gas streams resulting from the operation of various types of processes including processes for the production of heat or power, and industrial, chemical, combustion, material handling and other processes.

Although Congress passed the Clean Air Act of 1970 and, since that time, has passed additional legislation directed toward the improvement of air quality, the quantity of acid gases, for example, sulfur dioxide ($SO_2$), entering the air has not decreased as much as expected. Currently about 20 million tons of sulfur dioxide are released per year into the atmosphere from sources within the United States. While the sulfur dioxide emitted from power plants and ore smelters is a major source of acid rain, nitrous oxides, which produce nitric acid in the atmosphere, are generated by internal combustion engines and are also a substantial contributing factor to the problem. Incinerators, for example, may also emit chlorine-containing gases which form hydrochloric acid in the atmosphere as well as sulfur dioxide.

During the past 25 years a number of solutions to the acid rain problem have been suggested but these have foundered on the twin shoals of money and politics. Although wet scrubbers have been installed on a number of power plant boilers, incinerators and smelters, these scrubbers are relatively expensive to operate and maintain and do not generally improve the operating efficiency of the plant. They thus add cost to the process which, for some operations, may be prohibitive. Politically it has proven difficult to impose such higher costs on the energy industry or other basic industries in a given area, such as the midwest, where the result might be to diminish the industrial base. Similarly, it has been politically difficult to discourage the use of high-sulfur eastern coal in eastern or midwestern power plants in favor of the lower-sulfur western coals.

While certain types of wet scrubbers are capable of removing a relatively high percentage of the acid gas contained in a polluted gas stream, the result may be to trade air pollution for water pollution since the captured acid gases are entrapped by the scrubbing water. Further treatment of the scrubbing water is needed before it can be reused or discarded. Moreover, many industrial processes, including ore smelters, may be located in areas where water is scarce.

Attempts have been made to use dry or damp processes to capture acid gases. Such processes ordinarily employ powdered lime or limestone but usually are incapable of removing more than about 60% to 80% of the $SO_2$ contained in a gas stream.

It thus appears that there is a need for a process and apparatus capable of reliably removing substantially all of the acid gas from a gas stream in the dry condition and at a relatively low cost. The present invention relates to such a process and apparatus.

2. Description of the Prior Art

Many polluted gaseous streams contain both particulate matter which may vary widely in size, shape and chemical composition and noxious gases such as sulfur dioxide, hydrogen sulfide, chlorine, or various nitrous oxides. The noxious gases are usually acidic in nature and may be reacted with basic chemicals to form sulfates, carbonates, chlorides or nitrates which, if dry, can be disposed of without great expense or difficulty. Some pollution control apparatus is effective to capture both particulate and acidic gases while other apparatus is effective on only one of these pollutants.

One well-known category of equipment is the fabric filter which is usually in the form of a plurality of bags mounted in parallel to form a baghouse. The baghouse is capable of trapping particulate as small as about 1.0 micron in size but it is not well adapted to the removal of gaseous pollutants. Efforts have been made to include a powdered basic material such as lime in the bags but this has not proved to be entirely satisfactory.

Another category of equipment is the mechanical separator. This usually takes the form of a centrifugal separator or cyclone. Sometimes a number of small cyclones are connected in parallel since the efficiency of a cyclone is inversely proportional to its diameter while its capacity is directly proportional to its diameter. As the cyclone depends upon centrifugal forces to separate the particulate from the gas stream, it is relatively ineffective for the separation of gaseous materials. The cyclone is most effective for particulate in excess of about 10.0 microns in size.

A third category of gas stream cleaners is the electrostatic precipitator in which the gas stream passes between oppositely charged plates after being charged to one polarity. The particulate will then be attracted to the plate charged to the opposite polarity. While the electrostatic precipitator is widely used, it is most effective for particulate above about 2 to 3 microns in size. Additionally, the precipitator is relatively expensive to operate and maintain; its performance tends to deteriorate with time; and it is sensitive to combustible material in the gas streams. Finally, the precipitator is not effective with respect to acid gases, such as sulfur dioxide.

The above equipment is generally of the dry type. A variety of wet scrubbers have also been developed. These include venturi scrubbers in which the gas stream is accelerated through a venturi and a stream (or streams) of water is injected at the venturi throat to collide with the particulate. Venturi scrubbers are shown, for example in U.S. Pat. Nos 3,385,030; 3,490,204; 3,567,194; 3,582,050 and 3,812,656. The venturi scrubbers are effective for particulate down to a size of 1 to 2 microns. If basic reagents are added to the scrubbing water, substantial quantities of acid gases may be removed. However, the venturi scrubbers are energy intensive and are typically operated at a pressure drop of 30 to 45 inches of water or higher. Not surprisingly, the effectiveness of the venturi scrubbers increases as more energy is supplied.

During the 1970's a number of improvements were made in the wet scrubbing technology. Ejector driven or fan driven scrubbers employing centrifugal separators or separated flow separators were developed which included the first use of the mixing capability of the free jet nozzle. Such apparatus is shown, for example, in U.S. Pat. Nos. 3,852,408; 3,852,409 and 4,141,701. Due to the development of much smaller droplets which were more effectively mixed with the gas stream, both particulate and acid gases were collected simultaneously with very high efficiency. Though far more efficient than the venturi scrubbers, these devices still required about 20–40 inches of water pressure drop to collect the desired amount of pollutants. In common with other wet scrubbing systems, the collection efficiency increased as the amount of energy delivered to the system increased.

The art has also developed pollution control systems that represent a combination of earlier developed devices. See, for example, U.S. Pat. No. 3,894,851. Thus it has been common to use a spray chamber followed by a cyclone separator or a venturi scrubber; a venturi jet scrubber followed by a separator; or two venturi jet scrubbers followed by a separator. U.S. Pat. No. 3,852,408 discloses a system for removing particulate and gaseous sulfur dioxide (or other acid gases) comprising a spray chamber for conditioning the polluted gas stream and removing large particulate, a hot-water drive and a chemical injection unit for driving the gas and capturing the remaining particulate and sulfur dioxide in water droplets, means for enlarging the droplets, and a cyclone separator for separating the water droplets containing the particulate and sulfur dioxide reaction products from the stream of cleaned gas. A similar system is shown in U.S. Pat. No. 3,852,409 wherein the driving system utilizes a steam ejector and a water spray in place of the hot water drive A still further development is shown in U.S. Pat. No. 4,141,701 which discloses a drive system employing supersonic steam, air, or gas ejectors or subsonic free jet nozzles as the drive unit and an aerodynamic flow separating system to separate the pollutant-containing water drops from the cleaned gas. Although the systems disclosed in U.S. Pat. Nos. 3,852,408; 3,852,409 and 4,141,704 are capable of removing substantially all of the acidic gases contained in a stream of polluted gas, the acidic gases are entrapped by water and this necessitates water treatment facilities.

In order to avoid the water treatment problem, attempts have been made to employ dry or semi-dry processes to remove acidic gases, principally sulfur dioxide. One approach has been to prepare a slurry of ground lime and water and to spray the slurry into a chamber containing hot contaminated gases. This technique, known as spray drying, has the advantage that the resulting product is a dry product comprising gypsum which may be easily collected, along with other particulate, in a baghouse. However, collection of more than 70–80% of the acid gases has not been feasible. Moreover, the efficiency of the utilization of the basic reagent, e.g., hydrated lime or limestone, is relatively low. Sodium-based reagents are generally more reactive but also more expensive.

Dry injection systems involving the pneumatic introduction of a dry, powdery alkaline material into a flue gas stream have also been suggested. In these systems, the alkaline material is usually injected upstream from an electrostatic precipitator or baghouse. Sodium based sorbents such as sodium carbonate, sodium bicarbonate, nahcolite (a mineral containing about 80% sodium bicarbonate) or trona ore which contains both sodium carbonate and sodium bicarbonate have been used. Lime has heretofore been tested in a dry injection system but has not been demonstrated with much success. Kelly, Mary E. and Shareef, S. A. *Third Survey of Dry SO₂ Control Systems* (1981), p. 6.

SUMMARY OF THE INVENTION

In accordance with the present invention, applicants have developed a process for the removal of acid gases from an effluent gas stream which comprises the steps of conditioning the effluent gas stream to a desired temperature and moisture content; providing a dry pulverized alkaline agent; suspending the pulverized alkaline agent in a fluid stream which may comprise a gas stream, a vapor stream or a mixture of gases and vapors; turbulently mixing the effluent stream and the fluid stream containing the pulverized alkaline agent; injecting a stream comprising fine fluid droplets suspended in a gas or vapor into the mixture of the effluent stream and the fluid stream containing the pulverized alkaline agent; turbulently mixing the effluent stream and the droplet-containing stream under controlled conditions of temperature and relative humidity to cause limited condensation whereby the acid gases from the effluent stream are juxtaposed with the pulverized alkaline agent in the presence of the fluid vapor and fluid droplets at a controlled temperature; reacting the acid gases with the pulverized alkaline agent; repeating the steps of adding a stream comprising fine fluid droplets suspended in a gas or vapor to the effluent stream, turbulently mixing the stream of fine fluid droplets and the effluent gas stream under controlled conditions so as to further react the acid gases in the effluent stream; and separating the remaining pulverized alkaline agent and the reaction products from the effluent stream to provide a gas stream substantially free of acid gases. If the preliminary conditioning step is a heat exchange process, such as a waste heat boiler, so that the gas is cooled but not moisturized, it may be desirable to add moisture in the form of atomized droplets of water at the entrance to the mixing tube, at which point the gas stream temperature is high enough to vaporize the fine water droplets.

The acid gases amenable to the present process include sulfur dioxide ($SO_2$), hydrogen sulfide ($H_2S$), hydrogen chloride (HCl), sulfurous or sulfuric acids ($H_2SO_3$ and $H_2SO_4$) and nitrous oxides ($NO_x$). Preferably, the alkaline agent is finely pulverized hydrated lime ($Ca(OH)_2$) although pulverized lime (CaO) or limestone ($CaCO_3$) may also be used. Sodium based sorbents such as sodium carbonate ($Na_2CO_3$), sodium bicarbonate ($NaHCO_3$) or minerals containing these substances such as nahcolite and trona ore may be used but the sodium-based sorbents are generally more expensive than the calcium-based sorbents and, in addition, may pose disposal problems. The reaction product of the calcium-based sorbents and sulfur-containing acidic gases is essentially gypsum ($CaSO_4$) or hydrated gypsum ($CaSO_4 \cdot 2H_2O$) which may easily be disposed of. The reaction between the alkaline reagent and the acid gas is facilitated or catalyzed by the presence of an existing liquid droplet or a condensed liquid droplet though the liquid droplet does not enter into the reaction. Preferably, though not necessarily, the liquid may be water. Preferably, the stream in which the liquid droplets are entrained comprises low pressure steam though air at a range of humidity levels may also be used. During and following each mixing or reaction step, the temperature and humidity is controlled to provide controlled condensation of liquid on the particles of alkaline reagent which function as nucleation sites. However, free water fall-out in the system is detrimental to the process.

BRIEF DESCRIPTION OF THE DRAWINGS

Further objects and advantages of the present invention will become apparent to those skilled in the art from the following detailed description and the accompanying drawings in which:

FIG. 3A is a further enlarged view of the alkaline sorbent injector or addition device shown in FIG. 3;

FIG. 6 is a cross-sectional view of a humidifying nozzle in accordance with the present invention;

FIGS. 6A and 6B are fragmentary sectional views of alternative humidifiers for use in the humidifying nozzles shown in FIG. 6;

DETAILED DESCRIPTION OF THE INVENTION

Figure 8:
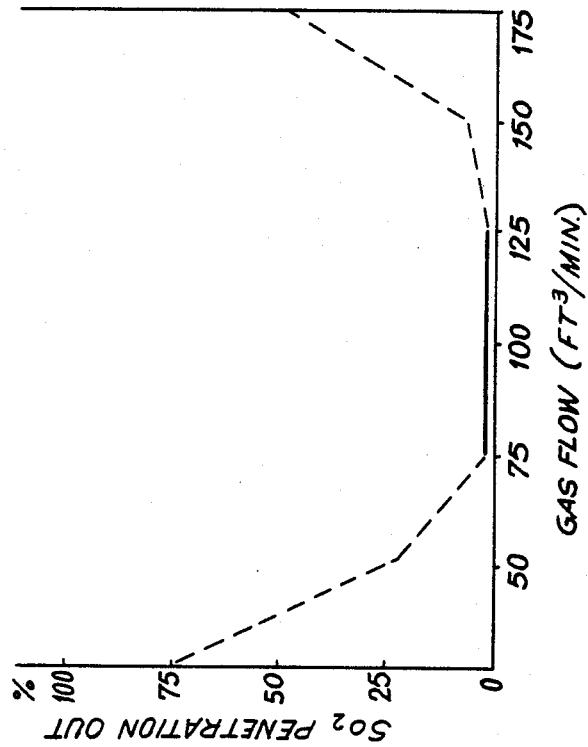
FIG. 8 is a graph showing the penetration of sulfur dioxide as a function of the gas flow through the reactor.

The present invention is directed to a process for the removal of acid gases from an effluent stream, which may be the off-gas from a combustion furnace, an incinerator, or other chemical or industrial plant, through the dry injection of an alkaline reagent. For simplicity of description, the invention will be described in terms of the removal of sulfur dioxide from a stream of air by the use of hydrated lime ($Ca(OH)_2$) or limestone ($CaCO_3$) The overall reaction for the stoichiometric removal of sulfur dioxide with hydrated lime is:

$$Ca(OH)_2 + \tfrac{1}{2}O_2 + SO_2 \rightarrow CaSO_4 + H_2O \quad (1)$$

If less than the stoichiometric amount of lime is employed, e.g., half the amount, sulfuric acid will also be produced:

$$Ca(OH)_2 + O_2 + 2SO_2 \rightarrow CaSO_4 + H_2SO_4 \quad (2)$$

As the production of sulfuric acid is undesirable, and as it is impossible, as a practical matter, to obtain complete and perfect mixing, some excess sorbent will always be required.

If limestone is used as the sorbent the overall reaction is:

$$CaCO_3 + \tfrac{1}{2}O_2 + SO_2 \rightarrow CaSO_4 + CO_2 \quad (3)$$

Other reactions are also possible when lime or limestone are employed. For example:

$$Ca(OH)_2 + SO_2 \rightarrow CaSO_3 + H_2O \quad (4)$$

$$CaCO_3 + SO_2 \rightarrow CaSO_3 + CO_2 \quad (5)$$

The potential for a reaction to occur depends upon the standard state free energy of reaction ($\Delta G° = G°_{products} - G°_{reactants}$) while the standard state heat of reaction ($\Delta H° = H°_{products} - H°_{reactants}$) indicates whether the reaction is endothermic or exothermic, where negative heats of reaction indicate exothermic reactions and positive heats of reaction indicate endothermic reactions. Thermodynamically, exothermic reactions are less favorable at higher temperatures while kinetically, all reactions are favored by higher temperatures.

In terms of descending reaction potential the reactions set forth above can be listed as follows:

TABLE I

| Reaction | $\Delta G°_{400K}$ (cal/mol) | $\Delta H°_{400K}$ (cal/mol) |
|---|---|---|
| (1) | −78,000 | −125,000 |
| (3) | −63,000 | −125,000 |
| (4) | −23,000 | −37,250 |
| (5) | −8,200 | −14,750 |

It is apparent from Table I and the reaction equations that, on a thermodynamic basis, the use of hydrated lime is preferable to limestone; that low temperatures are preferred over high temperatures; and that more water should be required when limestone is used.

Although not shown by equations (1) and (3), the excess water in the reaction bonds to the sulfates to form hemihydrated gypsum ($CaSO_4 \cdot \tfrac{1}{2}H_2O$) or dihydrated gypsum ($CaSO_4 \cdot 2H_2O$). It may also be significant that the specific volume of a mole of hydrated gypsum is greater than the specific volume of a mole of hydrated lime.

Applicants have discovered that if the physical and chemical conditions are properly selected, substantially all of the acid gases may be reacted with a lower stoichiometric quantity of hydrated lime to form gypsum (or hydrated gypsum) than is required by existing systems. The selection of the physical and chemical conditions is based upon a consideration of the sometimes conflicting thermodynamic and kinetic predictions concerning the reactions involved.

Figure 7:
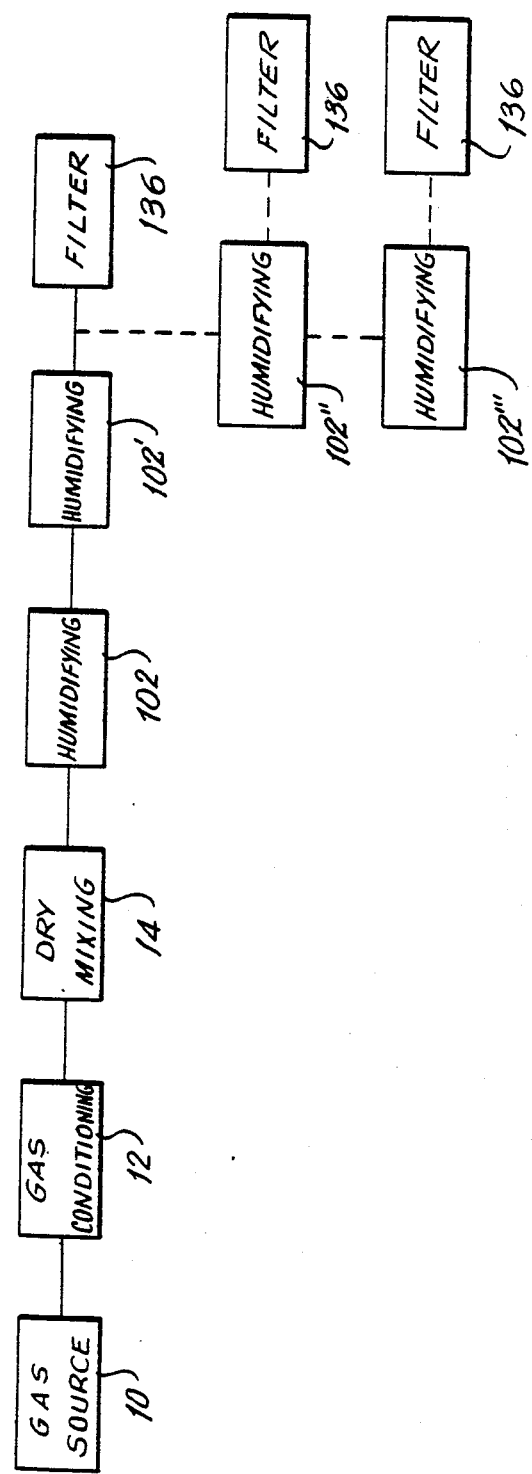
FIG. 7 is a block diagram showing the process in accordance with the present invention.

Reference will first be made to FIG. 7 which illustrates a schematic block diagram of the process. Designator 10 represents a gas source which may be any machine or chemical process which emits a gaseous effluent containing one or more acidic gases. The gaseous effluent may be at any temperature in the range from ambient temperature to well over 2000° F. and may include particulate matter ranging in size from sub-micronic particles to particles of substantial size.

The effluent gas from the gas source 10 may require a step of conditioning 12 if its temperature, for example, is excessive. Such conditioning may involve a heat exchange step to reduce the gas temperature to the range of 300°–400° F. If there is no need to reclaim the sensible heat of the effluent gas, the gas conditioning may be performed in a spray chamber using a water spray. This latter type of conditioning has the advantage that the gas stream will be at least partially humidified and part of the $SO_2$ gas reacted to form liquid sulfuric acid while most of the large particulate matter, if any, will be removed from the gas stream.

Following the conditioning step, if required, a dry mixing step 14 is performed. In this step, the dry powdered alkaline sorbent is injected into and mixed with the conditioned gas stream. As noted above the powdered alkaline sorbent may be lime (CaO), hydrated lime ($Ca(OH)_2$), limestone ($CaCO_3$), or a sodium-based sorbent as such sodium carbonate, sodium bicarbonate, nahcolite, or trona ore. While the sodium-based sorbents are generally more reactive than the calcium-based sorbents, they are also generally more expensive. The calcium-based sorbents, which have heretofore been thought to be ineffective in a dry injection process, are preferred by applicants because of their lower cost and the fact that the principal product of reaction is gypsum or hydrated gypsum which is readily usable or disposable.

The dry mixing step 14 involves providing finely pulverized sorbent, injecting it into the gas stream and thoroughly mixing the sorbent and the gas stream. The dry mixing step 14 is indicated on FIG. 2 within the dotted line 14 and comprises the sorbent addition mechanism 16 and the dry mixing nozzle 18. The sorbent addition mechanism 16 is shown in more detail in FIGS. 4 and 4A while an alternative sorbent addition mechanism is shown in FIG. 5. The dry mixing nozzle 18 is shown in more detail in FIG. 3.

Figure 4:
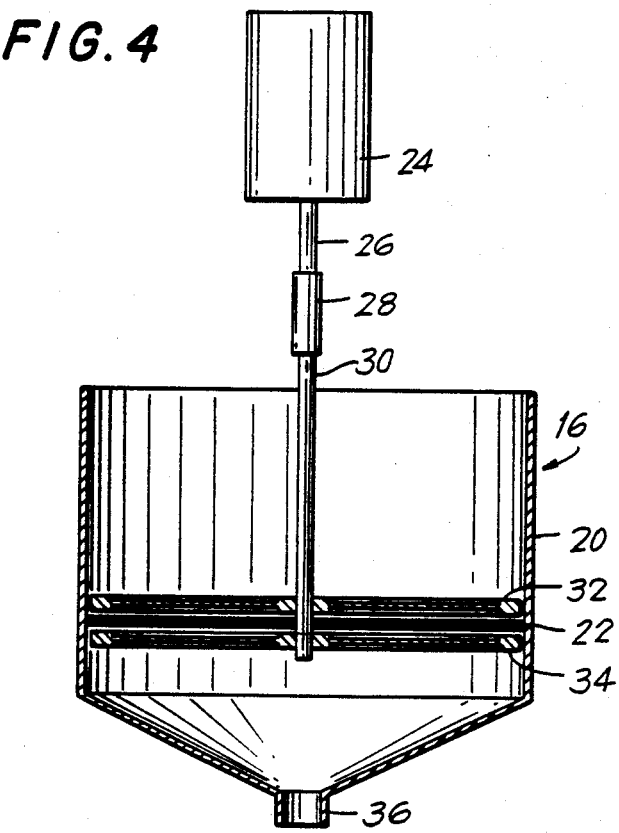
FIG. 4 is a vertical sectional view of the alkaline sorbent addition mechanism.
Figure 4A:
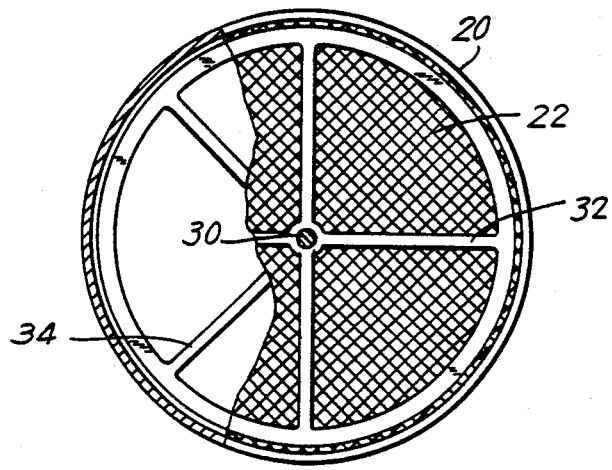
FIG. 4A is a plan view partly broken away of the alkaline sorbent addition mechanism shown in FIG. 4.
Figure 5:
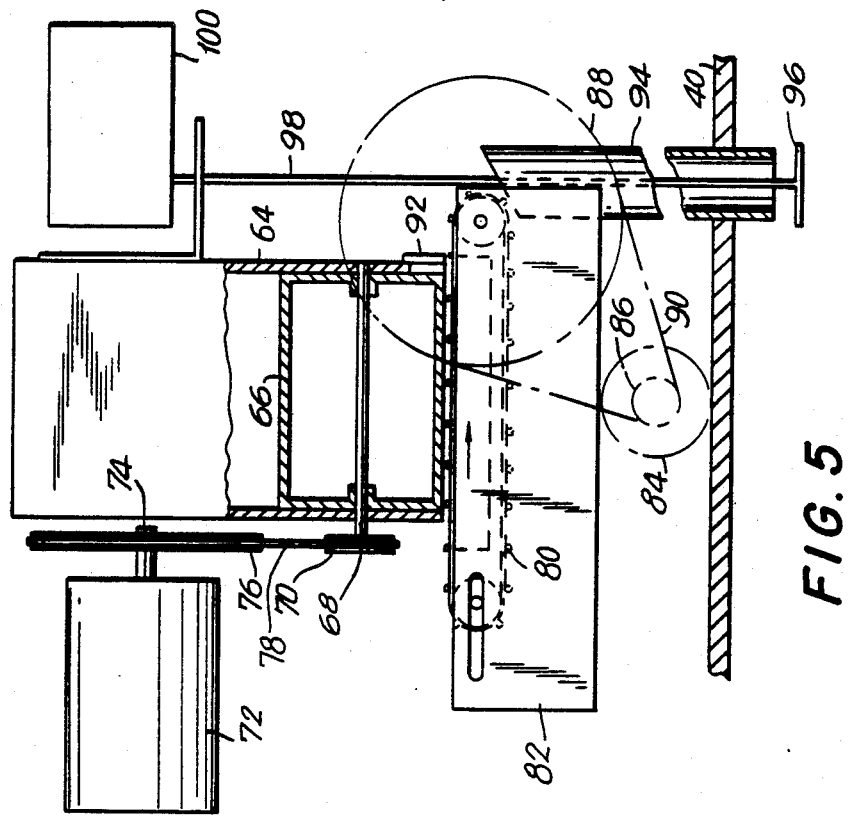
FIG. 5 is an elevational view partly in section showing another type of sorbent addition mechanism.

Referring to FIGS. 4 and 4A, the sorbent addition mechanism 16 may comprise a cylindrical sifter body 20 having a sifter screen 22 mounted therein. A motor 24 mounted on the axis of the sifter body 20 has a drive shaft 26 connected coaxially by a connector 28 with a sifter shaft 30. A pair of brush wheels 32, 34 are mounted on the sifter shaft 30 respectively above and below the sifter screen 22. The brush wheels 32, 34 promote uniform flow of the powdered sorbent material through the sifter screen 22. To avoid agglomeration of the powdered sorbent material it is important to maintain the moisture content of the sorbent material at a low level. To increase the activity between the sorbent material and the acid gases, the surface area of the sorbent material should be maximized by minimizing the size of the sorbent particles. As an example, applicants have employed hydrated lime having particle sizes of 44μ and 150μ and limestone having particle sizes of 3μ and 44μ. However, while acid gas reactivity is increased as the reagent particle size decreases, the reactivity also depends on the relative size of the reagent particles and the liquid droplets as will be explained in more detail below.

Figure 2:
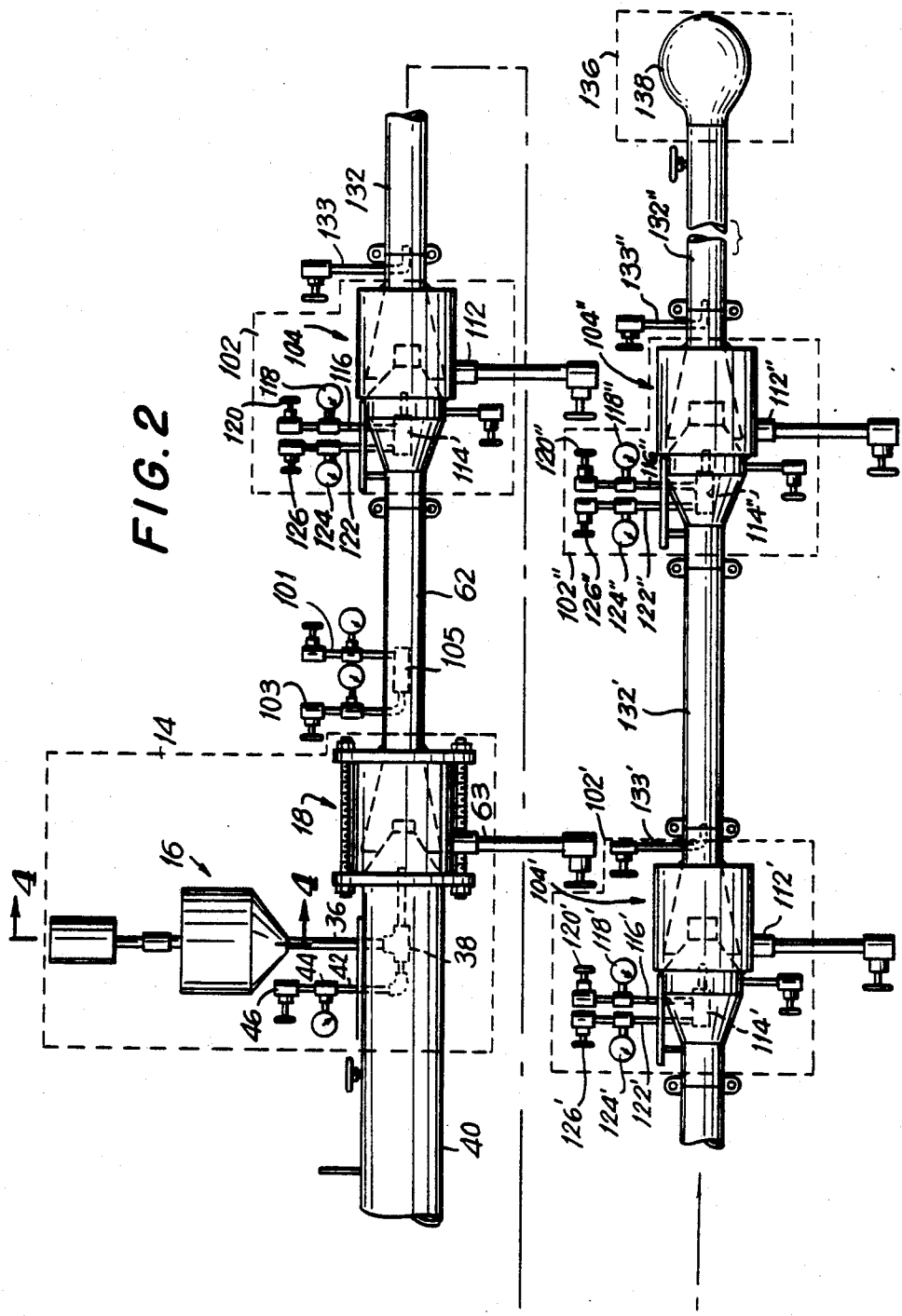
FIG. 2 is a schematic diagram of a test apparatus according to the present invention wherein an acid gas may be removed from a gas stream by means of a dry alkaline sorbent.
Figure 3:
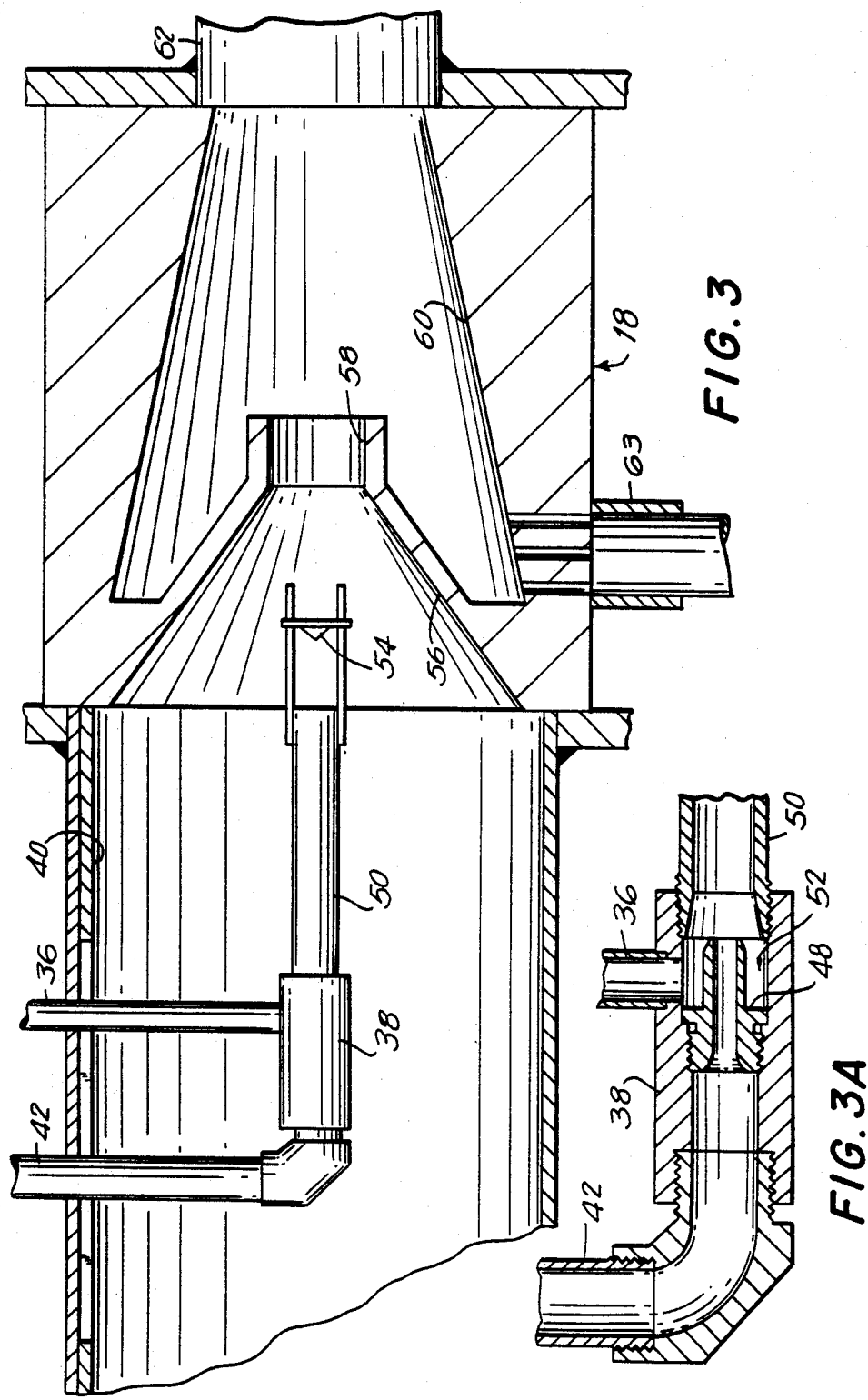
FIG. 3 is an enlarged view of the alkaline sorbent injection or addition device and mixing nozzle.

As shown more clearly in FIGS. 2 and 3, the powdered sorbent material sifted through the screen 22 is delivered to feed tube 36 and thence to an ejector 38 located along the axis of the conditioned gas duct 40. The ejector 38 is preferably driven by compressed air fed through a line 42. A pressure gage 44 and a regulator valve 46 may be located in the line 42 to control the operation of the ejector 38. As best shown in FIGS. 3 and 3A, the ejector 38 includes an ejector nozzle 48 and a delivery tube 50, both of which are disposed substantially axially within the conditioned gas duct 40. The exit end of the nozzle 48 is located slightly downstream from the feed tube 36 so that the jet of air emerging from the nozzle 48 will induce a low pressure within the ejector chamber 52 and thereby draw the pulverized sorbent material from the feed tube 36. The sorbent material will become entrained in the air jet flowing through the delivery tube 50. Spaced from the exit end of the delivery tube 50 is a deflector assembly 54 which redirects the flow of the air jet and its entrained sorbent material in a generally radial direction across the flow of the conditioned gas within the duct 40.

It will be seen from FIGS. 2 and 3 that the dry mixing nozzle 18 includes a converging section 56 and a throat section 58. The mixing nozzle 18 is of the free jet type, i.e., the nozzle discharges into a closed chamber 60 which is substantially larger than the jet and materially increases the mixing within the jet. Preferably, the converging section 56 has an included angle of about 72° or a cone angle of about 36°, where the cone angle is defined as the angle between the axis of the cone and an element of the cone. Preferably, the entry area of the nozzle is about five times the size of the exit or throat area so that the entry diameter is about 2¼ times the throat diameter. The length of the nozzle is about equal to the altitude of an imaginary cone defined by the converging section of the nozzle. This may be expressed by the following equation:

$$L_1 = \frac{D_1/2}{\tan 36°} = \frac{D_1}{1.453}$$

where
$L_1$ = length of nozzle
$36°$ = cone angle
$D_1$ = entry diameter of nozzle.

The delivery tube 50 and deflector 54 are located adjacent the entry of the converging portion 56 of the nozzle 18. Thus, the pulverized sorbent material is delivered across the cross-section of the conditioned gas stream as that stream is accelerating within the nozzle so as to mix with the gas stream and become entrained therewith. The conditioned gas with its entrained pulverized sorbent leaves the throat 58 of the mixing nozzle 18 as a free jet and enters the mixing duct 62. Further mixing occurs both in the free jet and in the mixing duct 62 which, preferably, has a length to diameter ratio of about 3 to 6 in order to provide maximum mixing of the conditioned gas and pulverized sorbent material. For purposes of using the L/D ratio to determine the length of the mixing duct 62, the length of the nozzle and free jet chamber 60 may be included since mixing begins in the converging section of the nozzle. A drain 63 is provided in the mixing nozzle 18 to drain off any liquid material which may collect in the nozzle.

As an alternative to the sifter type of sorbent additive mechanism shown in FIGS. 2, 3 and 4, a conveyer type mechanism as illustrated in FIG. 5 may be employed. In this mechanism, the pulverized sorbent is delivered to a bin 64 containing an agitator 66 mounted for rotation on a shaft 68 upon which is secured a driven pulley 70. A motor 72 having a drive shaft 74 upon which a drive pulley 76 is located is secured to the bin 64. A belt 78 interconnects the drive pulley 76 and the driven pulley 70. A conveyer belt 80 is carried by a frame 82 positioned so that the conveyor belt 80 passes through the bottom of the bin 64. The conveyor belt 80 is driven by a variable speed motor 84 through pulleys 86, 88 and belt 90. The conveyor belt 80 passes through a metering orifice 92 in one side of the bin 64 and delivers a metered quantity of pulverized sorbent material to the feed duct 94 which passes through the wall of the conditioned gas duct 40. Dispersal of the pulverized sorbent material within the duct 40 may be facilitated by rotatable vaned disc 96 mounted on a shaft 98 driven by a motor 100. It will be understood that the rate of delivery of the pulverized sorbent material to the conditioned gas duct 40 is a function of the speed of the conveyor belt 80 and the adjustment of the metering orifice 92. It will also be understood that the injector mechanism of FIGS. 3 and 3A may be used in place of the rotatable vaned disc mechanism shown in FIG. 5, if desired.

At the exit of the mixing nozzle 18 and at the entry of the mixing tube 62, a temperature in the vicinity of 275°

F. will usually be experienced. As this temperature is sufficient to vaporize water, the humidity of the stream may be increased with a minimum risk of free water fall-out by injecting atomized water at this point. The water, which may be heated or unheated, is introduced through line 101. Steam or air, preferably at a pressure of 5 to 20 psig or higher, is introduced through line 103. Lines 101 and 103 enter a humidifier 105 which is similar to humidifier 114 described in detail below. Water line 101 and steam line 103 are provided with appropriate regulating valves and pressure gages.

As shown in FIG. 7, a first humidifying step 102 follows the dry mixing step 14. The first humidifying step 102 is performed in the portion of the apparatus shown by the dotted line 102 in FIG. 2 by a humidifying nozzle 104 shown in more detail in FIG. 6. The humidifying nozzle 104 comprises a converging section 106 and a throat section 108 and, like the mixing nozzle 18, is of the free jet type having a closed chamber 110 which is substantially larger than the jet and materially increases the mixing within the jet. Preferably, the converging section 106 of the humidifying nozzle has an included angle of about 72° and a cone angle of about 36° and the length of the nozzle is equal to the altitude of an imaginary cone defined by the converging section 106 of the nozzle. However, to provide for the increase in the mass flow rate due to the addition of water vapor and water droplets while maintaining a low pressure across the nozzle, the throat area of the humidifying nozzle 104 is increased by 40 to 50%, e.g., 45% over that of the mixing nozzle 18. In the event that additional humidifying nozzles are employed, the throat area should be increased by about 15% for each subsequent nozzle. A drain 112 is provided at the bottom of the nozzle chamber 110 to evacuate any liquid which may collect in the nozzle chamber. A humidifier 114 is positioned near the exit of the mixing duct 62. The humidifier 114 comprises a water line 116 having a pressure gage 118 and regulator valve 120 and a steam line 122 also having a pressure gage 124 and a regulator valve 126. The water line 116 and steam line 122 enter the humidifier body 128 as shown in FIGS. 6A and 6B so that the jet of steam emerging from the steam line 122 atomizes the stream of water emerging from the water line 116. As noted above steam at 20-25 psig and which may be saturated is adequate for the atomizing function. Such steam may be available as waste steam. Of course, if it is desired to add heat to the process, this may be accomplished by using heated water or superheated steam or both in the humidifier 114. The jet of steam and water droplets pass through a delivery tube 130 into the converging portion 106 of the nozzle 104 where it mixes with the mixture of conditioned gas and pulverized sorbent. Further mixing occurs as the humidified stream passes through throat 108 and forms a free jet within the chamber 110.

It is important to atomize the water into very fine droplets if the reaction with the pulverized sorbent is to be maximized. Where the sorbent is hydrated lime (Ca(OH)$_2$) the weight ratio of the water droplets to the lime particles should be about 15 to 1 while the volume ratio should be about 5 to 1. One means to further reduce the size of the water droplets is shown in FIG. 6B where a swirl nozzle 134 is attached to the end of the delivery tube 130 to provide a second atomization of the water droplets. Another means to provide suitably small water droplets is to drive water under high pressure, e.g., 50 to 100 psig or higher through a mist or fog nozzle having very small orifices so as to produce a fog in the humidifying nozzle comprising small droplets and water vapor. Within the mixing and reaction duct 132, which has a length to diameter ratio in the range of about 3 to about 6, (including the length of the nozzle 104 and chamber 110), a reaction occurs between the acid gas molecules and the pulverized sorbent particles which applicants believe is catalyzed by the water droplets and a controlled condensation of water vapor. In order for this reaction to occur at a rapid rate, it is necessary to establish a number of interrelated conditions.

First, the amount of moisture added to the gas stream should be sufficient to raise the relative humidity of the stream to a range of 75 to 100% when the stream is at a temperature within the range of up to about 110° to 140° F.

Second, the pressure drop ($\Delta P$) across the nozzle 104 should be relatively small, e.g., not more than about 2.0" of water (and, preferably, less) so as to trigger a limited condensation of water vapor around the adjacent acid gas molecules, lime particles and water drops. It is believed that the limited condensation brings the reactants together so that reaction is promoted even though, chemically speaking, water does not enter into the reaction. The total pressure drop ($\Delta P$) across the system (excluding the filter or separator) should be in the range of 8 to 16 inches of water. Applicants have observed that if the pressure drop across the nozzle is relatively large, droplets of free water may be formed and the reaction is inhibited while if the $\Delta P$ is small, the condensed droplets will also be small. This observation supports applicants' belief that it is the limited condensation, principally in the free jet region, which triggers the chemical reaction. Where the conditions are appropriate, the chemical reaction may be completed within about 0.5 seconds while the reactants are passing through the reaction duct 132 or subsequent portions of the apparatus.

Figure 1:
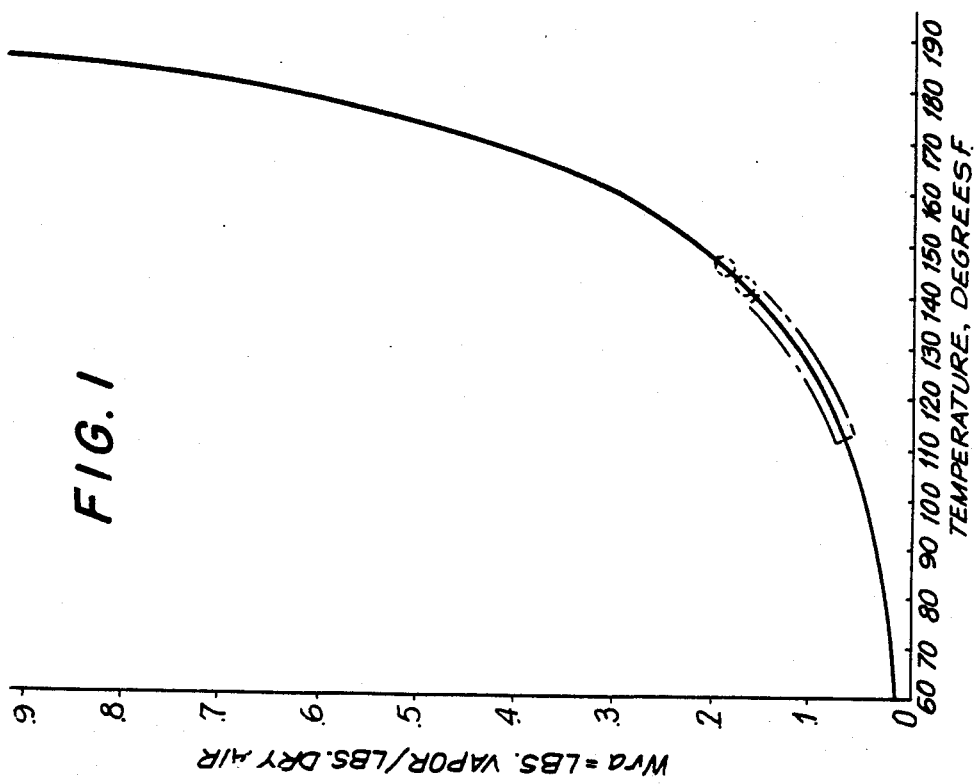
FIG. 1 is a graph showing the saturation curve for water vapor in air at ambient pressure as a function of temperature.

Third, the temperature range is regulated within the limits of about 110° F. to about 140° F. and preferably 115° F. to 130° F. This range is indicated on the saturation curve of FIG. 1. It will be observed that in the temperature range of 120° F. to 140° F. the air will be saturated with about 0.1 lb. of vapor per lb. of dry air while at about 200° F. almost 10 times as much water is required. Thus, if the process is attempted to be operated at higher temperatures, the tendency to produce free water within the system will be enhanced and this may result in the formation of lime agglomerations within the system.

Due to the difficulty in attaining and sustaining perfect mixing, applicants have found that improved performance can be attained by providing a plurality of humidifying nozzles 104 so as to repeat the humidifying and reaction steps in the process. Two additional humidifying nozzles are shown on FIG. 2 while three additional nozzles are shown on FIG. 7. As the additional nozzles are substantially like nozzle 104, the same designations are used, but with primes and double primes. Where additional humidifying steps are provided, as suggested in FIGS. 2 and 7, it is desirable to increase slightly, e.g., about 15%, the area of the throat section 108 so as to accommodate the additional mass flow rate without increasing the pressure drop across each nozzle. Where more than one humidifying nozzle is employed it may be desirable to operate the first nozzle at a temperature near the top of the 110° F. to 140° F. range while subsequent nozzles are operated at successively lower temperatures within that range. The operating temperature may be controlled by regulating the amount and temperature of the steam and the water injected into the humidifying nozzle. In order to regulate the temperature of gas flowing through the several reaction ducts 132, 132', 132", etc., it may be desirable to introduce steam, preferably superheated steam, near the entry of the reaction ducts 132, 132', 132". This is indicated by the steam lines 133, 133', 133", etc. Normally there should be no need to add heat at the first reaction duct 132 since the process can be otherwise controlled to provide a desired temperature near the top of the 110° F. to 140° F. range at this point. As the number of humidifying steps 102 is increased, the need for careful regulation of the temperature also increases. Steam from one or more of the lines 133, 133', 133", etc. will meet this need.

Due to the solubility of acid gases such as $SO_2$ in water, applicants have been able to remove 20–25% of the $SO_2$ in a carrier stream containing about 1,000 ppm of $SO_2$ by the use of steam and water alone. This suggests that complete removal of the $SO_2$ could be obtained with reagent quantities less than the stoichiometric ratio. However, this implies that the exiting gas stream would contain a quantity of sulfurous or sulfuric acid which may not be desired. Accordingly, stoichiometric ratios in excess of 1.0 should always be provided. Although the percentage removal of $SO_2$ increases with increases in the stoichiometric ratio up to about 3.0, applicants have consistently attained substantially complete removal of $SO_2$ from a gas stream containing about 1000 ppm of $SO_2$ at stoichiometric ratios of 2.3 using hydrated lime as the sorbent. In optimized systems of commercial size it is believed that stoichiometric ratios of 1.2 to 1.4 may be practical when using hydrated lime with a baghouse on the exhaust end providing about 20% removal of $SO_2$. Thus, almost 100% removal can be predicted. It is expected that slightly higher quantities of limestone will be required as limestone is less reactive thermodynamically than hydrated lime. (See Table I)

Following the final humidifying and reaction step, applicants provide a filtering step 136 in which the particulate contained in the gas stream is separated therefrom. The particulate will include some small amount of unreacted hydrated lime or limestone as well as the gypsum or hydrated gypsum particles ($CaSO_4$ or $CaSO_4 \cdot 2H_2O$) which result from the reaction of lime or limestone and sulfur dioxide together with other particulate matter which may be contained in the gas stream. Preferably, a fabric filter 138 such as a baghouse may be used since fabric filters are capable of collecting even submicronic sized particulate. An additional advantage of the baghouse is that since the unreacted sorbent will be trapped by the filter bags, any $SO_2$ which was not captured by the reactor (perhaps as a result of using a stoichiometric ratio under 2.0) may react with sorbent in the baghouse. In spray dryer installations incorporating a baghouse, typically about 20% of the initial $SO_2$ content is captured in the baghouse. However, if desired, an electrostatic precipitator may be used.

In the case of a baghouse or an electrostatic precipitator it is important that the relative humidity of the gas stream entering the filter be as low as possible since excess moisture may adversely affect the performance of either a baghouse or an electrostatic precipitator. This is one reason why the humidifying and reaction steps are preferably performed at temperatures below about 140° F. Another reason for preferring an operating temperature range below about 140° F. is that much less water is required for the humidifying and condensation steps at lower temperatures and the tendency to create a steam plume at the stack is diminished. In arid areas, sufficient water may not be available to operate economically at higher temperatures. Finally, the volume of the gas stream varies directly with its absolute temperature. Low temperatures permit the use of smaller ducts and substantially decrease the size and cost of the baghouse or electrostatic precipitator required for the filtering step. However, it is desirable that the gases exiting from the filter be at a sufficiently high temperature so as to rise through the exhaust stack without requiring a reheat step or an excessively tall stack.

Since the desired operating temperature range is relatively low, an opportunity may be presented to recover thermal energy from the gas stream in advance of the gas scrubber for use in other processes.

As noted above, it is possible to operate the process at temperatures above 140° F., e.g., 150° F.–190° F. However, at these higher temperatures, the water requirement is increased greatly and, due to the increasing slope of the saturation curve, it may become difficult to control the temperature drop through the nozzle so as to provide the required limited condensation. Moreover, additional humidifying nozzles may be required to avoid lime buildup in the apparatus or water carryover into the filter. Finally, as the chemical reactions by which the acid gases are removed are exothermic, lower temperatures are more favorable to these reactions. Thus, both technical and economic reasons militate against the use of higher temperatures than about 140° F. in the reaction zones.

It has been noted above that a low pressure drop across the free jet humidifying nozzles is desirable so as to promote limited condensation of fine droplets. Low pressure steam in the range of about 20–25 psi is sufficient to atomize water droplets and produce a low pressure drop, e.g., less than about 2" water, across the nozzle. Since limited condensation is desired, saturated steam may be employed. Thus, waste stream, which may be readily available, is quite satisfactory for the present process. Of course, if it is desired to add heat to the gas stream, the steam may be superheated. As a result of the low pressure drop across each nozzle, the gas stream moves through the apparatus at a relatively low speed, e.g., about 40 ft/sec. Thus, the apparatus need not employ long reaction chambers to accommodate the reaction which can be completed in about 0.5 seconds. Since a plurality of humidifying nozzles are normally employed, each reaction chamber need not provide a residence time of about 0.5 seconds; it is sufficient if the residence time within the reaction portion of the equipment is about 0.5 seconds.

In accordance with the present invention, superior results are attained at low temperatures, low pressures and low velocities. This is surprising since most gas cleaning devices perform better as the energy used to drive them increases. Applicants rely on aerodynamic principles, Gibbs Law (standard state free energy of reaction) and the standard state heat of reaction to take advantage of the thermodynamics and kinetics of the reactions between the acid gases and the sorbent material. The result is that the operating costs for applicants' system are relatively low.

Although it is convenient to construct the apparatus in a horizontal layout, it is apparent that there are advantages to a design wherein the mixing and reaction ducts are disposed vertically. A vertical arrangement would enhance mixing and inhibit fallout of the pulverized sorbent. Moreover, any liquid droplets passing through the apparatus could be removed in a separating elbow prior to entry into the baghouse or electrostatic precipitator.

Although applicants employ aerodynamic principles to maximize the physical and chemical reactions, applicants have found that it is not necessary to employ exotic materials or fine finishes within the reactor. Thus, low carbon steel pipe which may be longitudinally or spirally welded is adequate for the entry, mixing and reaction ducts. Applicants have noted that a coating of the basic sorbent material tends to form on the inside surfaces of the mixing and reaction ducts and that this coating tends to protect the ducts from corrosion by the acid gases. Thus, although sulfur dioxide in gaseous or dissolved form is known to be highly corrosive, applicants have noted only minor corrosion in their tests. Similarly, the nozzles may be fabricated as weldments from low carbon steel plate material. It may be desirable to harden the working surfaces of the nozzle as by boronizing such surfaces. If desired, the entry, mixing and reaction ducts may be formed from a plastic material such as fiberglass. Where unheated water is used, it may be necessary to protect against freezing conditions.

Referring again to FIG. 2, exemplary apparatus such as that shown may, for a flow rate of about 100 cubic feet per minute, employ a delivery duct 40 having a 6" diameter and a 3" diameter mixing duct 62 with a length of 1.5 feet and reaction ducts 132 which are 3" in diameter and about 1.5 feet long. The mixing nozzle has a throat diameter of 1.5 inches while the throat diameters of the successive humidifying nozzles are 1.75 inches; 2.07 inches and 2.25 inches. Using standard aerodynamic principles the apparatus may be scaled up to accommodate higher flow rates provided that the pressure drop across the humidifying nozzles is kept below about 2.0" of water for each nozzle and the length of the mixing duct and reaction ducts is sufficient to provide a residence time of about 0.5 seconds across the system for maximum performance. If the same pressure drop is maintained in larger units so that the flow velocity is kept low, the residence time will be increased due to the longer length of the equipment.

A module capable of handling about 1000 pounds per minute of an effluent or carrier gas stream would have the dimensions set forth in Table II below:

TABLE II

| 1,000 pound/minute Unit (Nominal) | |
|---|---|
| Delivery Tube Diameter | 39.0 inches |
| Mixing Nozzle Throat Diameter | 15.33 inches |
| Mixing Nozzle Length | 28.5 inches |
| Mixing Tube Length | 97.5 inches (min.) |
| Mixing Tube Diameter | 32.5 inches |
| 1st Humidifier Nozzle Throat Diameter | 18.5 inches |
| 1st Humidifier Nozzle Length | 28.5 inches |
| Reaction Duct Length* | 97.5 inches (min.) |
| Reaction Duct Diameter* | 32.5 inches |
| 2nd Humidifier Nozzle Throat Diameter | 19.88 inches |
| 2nd Humidifier Nozzle Length | 30.6 inches |
| 3rd Humidifier Nozzle Throat Diameter | 21.32 inches |
| 3rd Humidifier Nozzle Length | 32.8 inches |
| 4th Humidifier Nozzle Throat Diameter | 22.85 inches |
| 4th Humidifier Nozzle Length | 35.16 inches |
| 5th Humidifier Nozzle Throat Diameter | 24.51 inches |
| 5th Humidifier Nozzle Length | 37.72 inches |
| 6th Humidifier Nozzle Throat Diameter | 26.3 inches |
| 6th Humidifier Nozzle Length | 40.5 inches |

*Each Reaction Duct has a minimum length (including the length of the nozzle and nozzle chamber) of 97.5" and a diameter of 32.5".

A module will normally incorporate at least two humidifying nozzles and may have as many as six such nozzles with their associated reaction ducts. In general, as the $SO_2$ concentration increases, more basic sorbent is required and, therefore, more water is required. This, in turn, requires additional humidifying nozzles in order that no free water be introduced into the reactor. Also, if limestone instead of lime is used as the sorbent, more water is required and therefore more nozzles are required.

The module design set forth in Table II above utilizes a constant diameter for the mixing and reaction ducts. Where more than two humidifying nozzles are employed, it may be desirable to increase the diameter of the reaction ducts to accommodate the increased mass of the stream flowing therethrough. The increase in the reaction tube cross-sectional area may be adjusted so that the ratio of the throat area of the humidifying nozzle to the cross-sectional area of the reaction tube immediately following the humidifying nozzle remains approximately constant.

As shown by FIG. 8 which shows the penetration of $SO_2$ as a function of flow variation in a 100 ft.$^3$/min. test unit, substantially complete removal of $SO_2$ was attained at gas flows 25% greater or less than the design point. Below this range the $SO_2$ removal decreased because the unit did not run "full" and proper mixing was unattainable. Above this range, the gas velocity increased so that the reaction time was insufficient and the pressure drop across the nozzles was excessive. If process flow variations approach these limits, it may be desirable to utilize a modular design so that the flow through each module may be kept more uniform as described below.

It will be appreciated that the apparatus may be formed in a plurality of modular elements connected in parallel through a manifold with dampers or valves so that one or more modules can be shut off. Such an arrangement may have a number of advantages for a commercial operation. First, the modular arrangement requires less space than existing systems. Second, one or more modules may be cut off if the flow of polluted gases decreases so as to maintain a more uniform flow through each module. Third, if one or two spare modules are provided, scheduled or unscheduled maintenance may be performed without shutting down the operation of the system. Thus, the apparatus may provide 100% availability and eliminate the possibility that the plant may be out of compliance with air quality requirements.

Applicants have found that it is difficult to meter relatively small amounts of the dry pulverized sorbent material into the stream of polluted gas. For this reason, it may be desirable to use one sorbent addition mechanism to feed two or more modules containing humidifying nozzles. Similarly, it may be convenient to provide a manifold between the exit ends of the reaction ducts 132 and the filter 138 to permit independent maintenance of the filter units, whether fabric bags or electrostatic precipitators. However, when designing such systems, care must be taken to avoid sudden changes in gas velocity which may promote settling out of the sorbent particles or the reaction products of the sorbent particles and the acid gases.

The terms and expressions which have been employed are used as terms of description and not of limitation and there is no intention, in the use of such terms and expressions, of excluding any equivalents of the features shown and described or portions thereof, but it is recognized that various modifications are possible within the scope of the invention claimed.

What is claimed is:

1. A process for removal of acidic gases comprising gaseous sulfur dioxide, hydrogen sulfide, sulfurous acid, sulfuric acid, hydrogen chloride or nitrogen oxides from a first stream of carrier gas comprising providing a finely divided alkaline sorbent material, introducing said finely divided alkaline sorbent material into said first stream to form a second stream, passing said second stream through a first free jet nozzle to initiate mixing thereof, regulating the flow of said second stream through a mixing duct to provide further mixing, forming a third stream of vapor and liquid droplets, introducing said third stream into said second stream to form a fourth stream, regulating the flow of said fourth stream through a second free jet nozzle to mix said fourth stream and to condense at least a portion of said vapor, reacting at least a portion of said acidic gases with at least a portion of said finely divided alkaline sorbent material in a first reaction duct to form products of reaction and separating the remaining portion of said finely divided alkaline sorbent material and said products of reaction from said fourth stream.

2. A process as set forth in claim 1 in which the finely divided alkaline sorbent material is selected from the group consisting of calcium oxide, calcium hydroxide, calcium carbonate, sodium carbonate, sodium bicarbonate, nahcolite, trona ore or mixtures thereof.

3. A process as set forth in claim 1 in which said third stream of vapor and liquid droplets is a stream of steam and water droplets.

4. A process as set forth in claim 2 in which said third stream of vapor and liquid droplets is a stream of steam and water droplets.

5. A process as set forth in claim 3 in which said fourth stream has a relative humidity in the range of 75 to 100%.

6. A process as set forth in claim 4 in which said fourth stream has a relative humidity in the range of 75 to 100%.

7. A process as set forth in claim 5 in which the flow of said fourth stream is regulated through said second free jet nozzle so as to have a temperature in the range of 110° F. to 140° F.

8. A process as set forth in claim 6 in which said fourth stream is regulated through said second free jet nozzle so as to have a temperature in the range of 110° F. to 140° F.

9. A process for removal of acidic gases comprising gaseous sulfur dioxide, hydrogen sulfide, sulfurous acid, sulfuric acid, hydrogen chloride or nitrogen oxides from a first stream of carrier gas comprising providing a finely divided alkaline sorbent material, introducing said finely divided alkaline sorbent material into said first stream to form a second stream, passing said second stream through a first free jet nozzle to initiate mixing thereof, regulating the flow of said second stream through a mixing duct to provide further mixing, forming a third stream of vapor and liquid droplets, introducing said third stream into said second stream to form a fourth stream, regulating the flow of said fourth stream through a second free jet nozzle to mix said fourth stream and to condense at least a portion of said vapor, reacting at least a portion of said acidic gases with at least a portion of said finely divided alkaline sorbent material in a first reaction duct to form products of reaction, forming a fifth stream of vapor and liquid droplets, introducing said fifth stream into said fourth stream to form a sixth stream, regulating the flow of said sixth stream through a third free jet nozzle to mix said sixth stream and to condense at least a portion of said vapor contained in said fifth stream, reacting at least a portion of said acidic gases with at least a portion of said finely divided alkaline sorbent material in a second reaction duct to form products of reaction and separating the remaining portion of said finely divided alkaline sorbent material and said products of reaction from said sixth stream.

10. A process as set forth in claim 9 in which the finely divided alkaline sorbent material is selected from the group consisting of calcium oxide, calcium hydroxide, calcium carbonate, sodium carbonate, sodium bicarbonate, nahcolite, trona ore or mixtures thereof.

11. A process as set forth in claim 9 in which the said third and fifth streams of vapor and liquid droplets are streams of steam and water droplets.

12. A process as set forth in claim 10 in which the said third and fifth streams of vapor and liquid droplets are streams of steam and water droplets.

13. A process as set forth in claim 11 in which said fourth and sixth streams have a relative humidity in the range of 75 to 100%.

14. A process as set forth in claim 12 in which said fourth and sixth streams have a relative humidity in the range of 75 to 100%.

15. A process as set forth in claim 13 in which the flow of said fourth and sixth streams are regulated respectively through said second and third free jet nozzles so as to have a temperature in the range of 110° F. to 140° F.

16. A process as set forth in claim 14 in which the flows of said fourth and sixth streams are regulated respectively through said second and third free jet nozzles so as to have a temperature in the range of 110° F. to 140° F.

17. A process as set forth in claim 9 in which at least one additional group of steps comprising forming a seventh stream of vapor and liquid droplets, introducing said seventh stream into said sixth stream to form an eighth stream, regulating the flow of said eighth stream through a fourth free jet nozzle to mix said eighth stream and to condense at least a portion of said vapor contained in said seventh stream and reacting at least a portion of said acidic gases with at least a portion of said finely divided alkaline sorbent material in a third reaction duct to form products of reaction is performed prior to said separating step.

18. A process as set forth in claim 10 in which at least one additional group of steps comprising forming a seventh stream of vapor and liquid droplets, introducing said seventh stream into said sixth stream to form an eighth stream, regulating the flow of said eighth stream through a fourth free jet nozzle to mix said eighth stream and to condense at least a portion of said vapor contained in said seventh stream and reacting at least a portion of said acidic gases with at least a portion of said finely divided alkaline sorbent material in a third reaction duct to form products of reaction is performed prior to said separating step.

19. A process as set forth in claim 17 in which the said third, fifth and seventh streams of vapor and liquid droplets are streams of steam and water droplets.

20. A process as set forth in claim 18 in which the said third, fifth and seventh streams of vapor and liquid droplets are streams of steam and water droplets.

21. A process as set forth in claim 17 in which said fourth, sixth and eighth streams have a relative humidity in the range of 75 to 100%.

22. A process as set forth in claim 18 in which said fourth, sixth and eighth streams have a relative humidity in the range of 75 to 100%.

23. A process as set forth in claim 21 in which the flows of said fourth, sixth and eighth streams are regulated respectively through said second, third and fourth free jet nozzles so as to have a temperature in the range of 110° F. to 140° F.

24. A process as set forth in claim 22 in which the flows of said fourth, sixth and eighth streams are regulated respectively through said second, third and fourth free jet nozzles so as to have a temperature in the range of 110° F. to 140° F.

25. A process as set forth in any one of claims 1, 2, 9, 10, 17 or 18 in which said first stream of carrier gas is conditioned to a temperature in the range of 300° F. to 400° F. prior to the introduction of said finely divided alkaline sorbent material.

26. A process as set forth in any one of claims 1, 2, 9, 10, 17 or 18 in which said first stream of carrier gas is conditioned to a temperature in the range of 300° F. to 400° F. prior to the introduction of said finely divided alkaline sorbent material by passing said first stream of carrier gas through a spray chamber.

27. A process as set forth in any one of claims 1, 2, 9, 10, 17 or 18 in which the final separating step is performed with a fabric filter.

28. A process as set forth in any one of claims 1, 2, 9, 10, 17 or 18 in which the final separating step is performed in an electrostatic precipitator.

29. A process as set forth in claim 1 or 2 in which superheated steam is introduced into said fourth stream while said fourth stream is passing through said first reaction duct to regulate the temperature thereof.

30. A process as set forth in claim 9 or 10 in which superheated steam is introduced into at least one of said fourth stream and said sixth stream while said fourth stream is passing through said first reaction duct and said sixth stream is passing through said second reaction duct to regulate the temperatures of said fourth and sixth streams.

31. A process as set forth in claim 17 or 18 in which superheated steam is introduced into at least one of said fourth stream, said sixth stream and said eighth stream while said fourth stream, said sixth stream, and said eighth stream are passing respectively through said first, second and third reaction ducts to regulate the temperatures of said fourth, sixth and eighth streams.

* * * * *